Feb. 19, 1924.                                                    1,483,942
M. KEIL
FILM AND FILM SUPPORT FOR MOTION PICTURE MACHINES
Filed Jan. 28, 1920
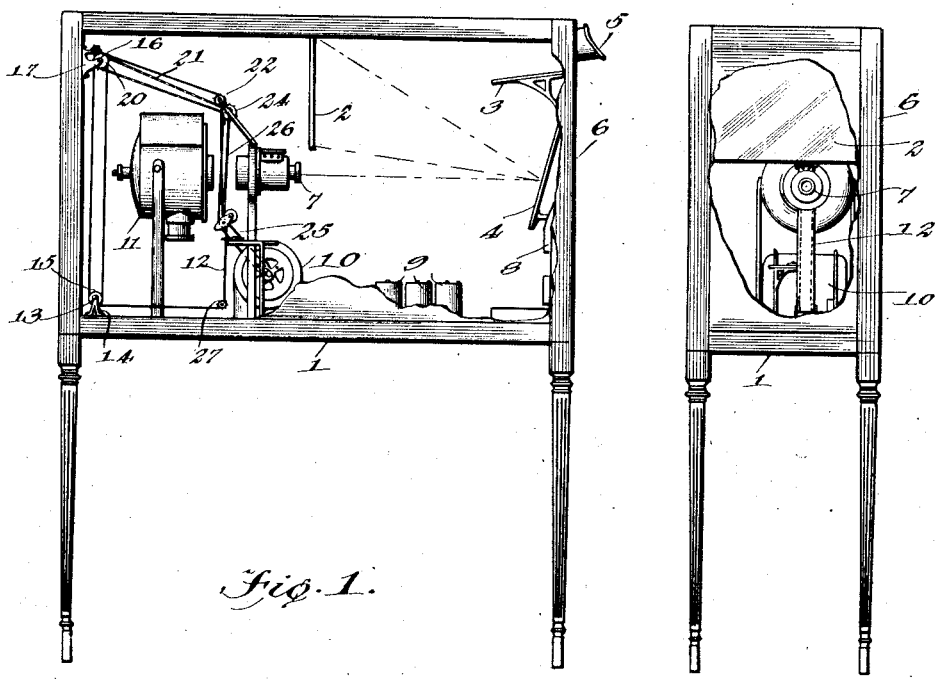
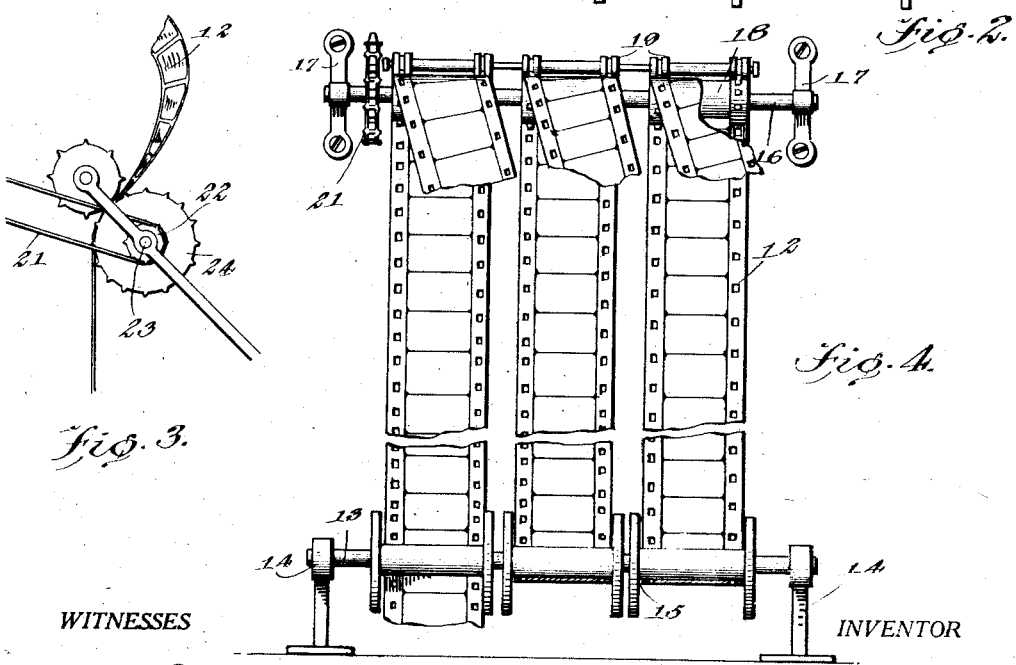
WITNESSES
INVENTOR
Morris Keil,
BY
ATTORNEYS Patented Feb. 19, 1924.

1,483,942

UNITED STATES PATENT OFFICE.

MORRIS KEIL, OF NEW ORLEANS, LOUISIANA.

FILM AND FILM SUPPORT FOR MOTION-PICTURE MACHINES.

Application filed January 28, 1920. Serial No. 354,609.

*To all whom it may concern:*

Be it known that I, MORRIS KEIL, a citizen of the United States, residing at New Orleans, in the parish of Orleans and State of Louisiana, have invented a new and useful Film and Film Support for Motion-Picture Machines, of which the following is the specification.

My present invention relates generally to motion picture exhibitors, and more particularly to an arrangement utilized in a coin controlled motion picture display cabinet wherein for instance the movement of the film to be displayed is brought about by electrical means under the control of a coin, the coin being in turn displaced from its effective controlling position when the film has been completely exhibited in order that the parts may come to rest and remain so until another coin is inserted. Generally speaking the object of my present invention is the provision of an endless film and film supporting arrangement in which strength and durability is such as to avoid ready breakage or displacement of the parts.

With the above general objects in mind, the features of the invention will be more readily understood from the following description referring to the accompanying drawings in which, Figure 1 is a side elevation of my improved cabinet, one side wall being removed to expose the interior thereof, Figure 2 is a front elevation, the front wall being partially broken away, Figure 3 is an enlarged side view of a portion of the film guiding and feeding arrangement, Figure 4 is a front elevation of a portion of the film and film supports located rearwardly of the projector.

Referring now to these figures my invention is preferably utilized in an apparatus wherein the motion picture is displayed within the cabinet 1 upon a depending vertically disposed screen 2 which may be viewed through the sight opening 5 in the upper portion of the front wall 6 of the cabinet or casing within which a baffle member 3, projecting generally in a horizontal direction below the sight opening, cuts off the view below the lower edge of the screen 2. The picture displayed on the screen 2 is directed thereon from a reflector 4 secured at a slight incline upon the front wall 6 of the cabinet and placed forwardly of the projector lens 7.

If the apparatus is coin controlled as contemplated in practice, any suitable means may be provided for closing an electrical circuit by the insertion of a coin through a coin chute generally indicated at 8 in Figure 1, the circuit so completed being from any suitable source of current such as a series of dry cells 9 located within the cabinet 1, and through an electrical motor 10 located below and in front of the projector 11, whose function will be presently understood. It is contemplated that the coin so inserted will remain in effective position until the film 12 has completely passed through the space between the projector 11 and its lens 7, and that some means of a suitable nature will be provided whereby upon such complete passage of the film, the coin will be displaced so that the circuit through the actuating motor 10 will thus be broken and movement of the parts will cease until another coin is inserted.

In the rear portion of the cabinet, rearwardly of the projector 11 is a film rack including a lower shaft 13 as particularly shown in Figure 4 mounted in bearings 14 on the cabinet base and provided with a series of film guiding rollers 15, the rack also including an upper shaft 16 journaled in brackets 17 and provided with a series of film engaging sprockets 18 with which tension rollers 19 coact. This upper shaft 16 of the film rack is also provided with a sprocket wheel 20 connected by a sprocket chain 21 with a sprocket wheel on a shaft 23 (see Figure 3) supported above the space betwen the projector 11 and the lens 7 and having film engaging sprockets 24 and suitable connections whereby it is driven from the shaft of the motor 10, such connections including, for instance, sprocket chains 25 and 26.

The film 12 is endless, having several loops around the several sprockets 18 and rollers 15 of the film rack and a single loop extending forwardly from the upper end of the film rack and downwardly around the film sprocket 24 between the projector 11 and the lens 7 to a point below the projector where the film passes around a guide roller 27 and from thence rearwardly to the lower shaft of the film rack.

It is thus obvious that irrespective of what means are employed for the purpose of closing the circuit through the actuating motor 10 in order to place the film 12 in movement, this film will continue to so move by virtue of the fact that it is endless and a considerable series of pictures will thus be passed through the space between the projector 11 and its lens 7 in spite of the comparatively small space within the casing or cabinet 1, by virtue of the looped arrangement of the film in the rear film rack, back and forth between and around the shafts 13 and 16 and their film engaging rollers.

I claim:

In a motion picture exhibiting apparatus employing an endless film, vertically spaced film guide rollers for a single strand of the film, a projector across which the strand of film passes between said guide rollers, vertically spaced horizontal shafts at the rear of the projector of which the lower shaft is provided with a series of flanged plain face rollers around which the lower portions of a series of strands of the film pass, the upper of said shafts having a series of film engaging sprockets receiving the upper portions of the said series of strands of the film, and connections for driving the said upper shaft and the said upper guide roller as described.

MORRIS KEIL.